(12) United States Patent  
Coenen et al.

(10) Patent No.: US 8,972,373 B2  
(45) Date of Patent: Mar. 3, 2015

(54) CUSTOMIZATION OF THE APPEARANCE OF A USER INTERFACE

(75) Inventors: Pieter Coenen, Lier (BE); Stefan Lodeweyckx, Leuven (BE); Pascal Piquepe, Hoeilaart (BE); Francis Van Aeken, Brussels (BE)

(73) Assignee: Sony Europe Limited, Weybridge (GB)

( * ) Notice: Subject to any disclaimer, the term of this patent is extended or adjusted under 35 U.S.C. 154(b) by 0 days.

(21) Appl. No.: 13/027,441

(22) Filed: Feb. 15, 2011

(65) Prior Publication Data

US 2011/0202519 A1 Aug. 18, 2011

(30) Foreign Application Priority Data

Feb. 15, 2010 (GB) .................................. 1002555.9

(51) Int. Cl.
*G06F 17/30* (2006.01)
*G06F 9/445* (2006.01)

(52) U.S. Cl.
CPC .... *G06F 17/30528* (2013.01); *G06F 17/30566* (2013.01); *G06F 9/44505* (2013.01)
USPC .................................... 707/708; 707/E17.11

(58) Field of Classification Search
CPC .................. G06F 17/30867; G06F 17/30905; G06F 17/30864; G06F 17/30749; G06F 17/30761; G06F 17/30; G06F 17/30035; G06F 17/3097; G06F 21/602; G06F 21/6227; G06F 21/6254; G06F 2221/2107
See application file for complete search history.

(56) References Cited

U.S. PATENT DOCUMENTS

| | | | |
|---|---|---|---|
| 2002/0135613 A1* | 9/2002 | O'Hara | 345/745 |
| 2004/0001088 A1 | 1/2004 | Stancil et al. | |
| 2005/0114371 A1 | 5/2005 | Woods | |
| 2005/0240918 A1 | 10/2005 | Shlomai | |
| 2006/0190441 A1* | 8/2006 | Gross et al. | 707/3 |
| 2007/0078718 A1* | 4/2007 | Gorodyansky | 705/14 |
| 2009/0177988 A1 | 7/2009 | Martins | |
| 2011/0276556 A1* | 11/2011 | Meier et al. | 707/706 |

FOREIGN PATENT DOCUMENTS

ES  2 302 587  7/2008
WO  WO 02/089437  11/2002

OTHER PUBLICATIONS

U.S. Appl. No. 13/027,448, filed Feb. 15, 2011, Coenen, et al.
U.S. Appl. No. 13/027,662, filed Feb. 15, 2011, Coenen, et al.
U.S. Appl. No. 13/026,796, filed Feb. 14, 2011, Coenen, et al.
Great British Search Report issued in Great British Patent Application No. GB1002555.9, filed Feb. 15, 2010.
Combined Chinese Office Action and Search Report issued Mar. 18, 2014 in Patent Application No. 201110039452.7 (English Translation only).

* cited by examiner

*Primary Examiner* — Shyue Jiunn Hwa

(74) *Attorney, Agent, or Firm* — Oblon, McClelland, Maier & Neustadt, L.L.P.

(57) ABSTRACT

A querying system in a computer apparatus may be customized by connection of a removable storage medium device to a storage medium interface of the computer apparatus. The computer apparatus detects whether, in the storage medium thereof, there is stored customisation data that indicates a change to the query engine data identifying locations where query messages are sent. If so, the query engine data in the computer apparatus is changed accordingly.

24 Claims, 5 Drawing Sheets

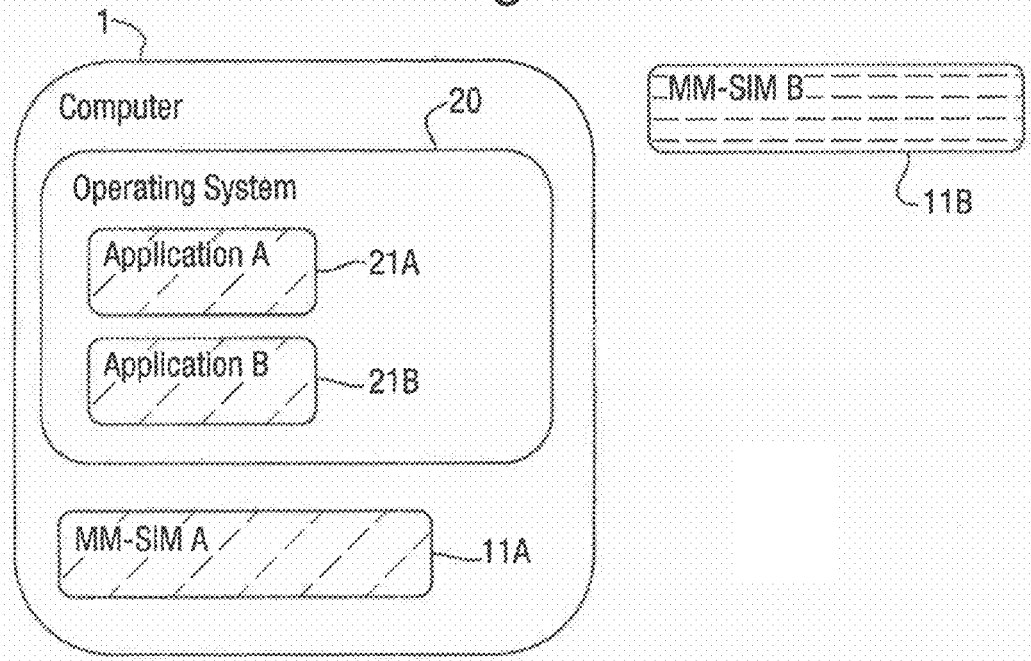
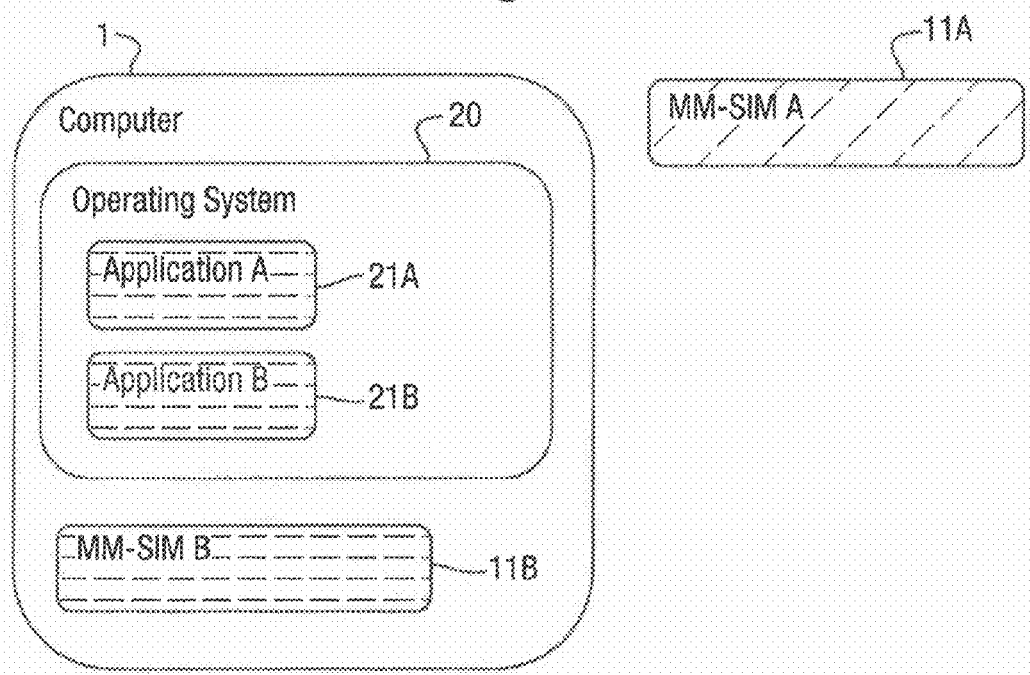

CUSTOMIZATION OF THE APPEARANCE OF A USER INTERFACE

CROSS-REFERENCE TO RELATED APPLICATIONS

This application is based upon and claims the benefit of priority from British Application No. 1002555.9 filed 15 Feb. 2010, the entire contents of which are incorporated by reference.

BACKGROUND OF THE INVENTION (1) Field of the Invention

The present invention relates to customization of a computer apparatus.

(2) Description of Related Art

The development of software applications for a computer apparatus typically takes a considerable period of time, for example to write and test the software and to undergo approval processes. For example in the case of a computer apparatus that is a laptop being developed as a new commercial product, it might in practical terms take a period of several months for changes to a suite of software applications to be made. The significant work required increases costs thereby acting as a barrier to making such developments.

Furthermore, the lead-in time creates a lag in the commercialisation of new products that is not compatible with many commercial activities, particularly for products with a short commercial life cycle. For example in the case of computer apparatuses supplied as part of a package with a telecommunications provider for mobile internet services, the commercial life cycle products is typically very short, and may only a period of a few months. Being as this period is of the same order as the period required to develop software for the computer apparatus, this acts as a barrier to the software developments being made at all.

It would be desirable therefore to allow for customisation of aspects of a computer apparatus in a manner that may be implemented more simply and more quickly.

BRIEF SUMMARY OF THE INVENTION

According to an aspect of the present invention, there is provided a method of customizing a querying system provided in a computer apparatus that is connected to a network and that comprises a storage medium interface to a removable storage medium device that includes a storage medium which is capable of connection, the computer apparatus storing query engine data identifying one or more locations on the network where a query engine is provided, the method being implemented by the computer apparatus and comprising:

sending query messages over the network to a location selected from the one or more locations identified by the query engine data, receiving result messages representing results of queries sent from the query engine over the network to the computer apparatus in response to the query messages, and displaying on a display device the results represented by the result messages; and on connection of a removable storage medium device to said storage medium interface, detecting whether the storage medium of the removable storage medium device stores customisation data that indicates a change to the query engine data, and, in response to detecting said customisation data, changing the query engine data stored in the computer apparatus.

Thus the present invention takes advantage of the fact that many computer apparatuses are supplied with a storage medium interface to which there is capable of connection a removable storage medium device that includes a storage medium. For example, a computer apparatus equipped for mobile telecommunications services might include a storage medium device that is a subscriber identity module card storing identification data that identifies a subscriber to a mobile telecommunications service.

That is to say, the present invention uses a storage medium device that is connected to the storage medium interface to perform the customisation. The storage medium of the storage medium device stores customisation data that specifies the nature of the customisation and the computer apparatus detects this customisation and changes the behaviour of the computer apparatus accordingly. In particular, the computer apparatus is customized by changing query engine data that identifies one or more locations on the network where a query engine is provided, to be used by a querying system provided by the computer apparatus that sends query messages to the query engines and displays the results represented by the result messages sent back in response to the query messages.

The customisation of the behaviour of the computer apparatus can therefore be changed simply by provision of the customisation data on the storage medium device. Thus the customisation can be implemented in a simple manner in a quick time scale. This provides the advantage that the customisation may be applied in many commercial circumstances where the development time for new software applications is in practice prohibitive. For example, in the case of computer apparatuses to be supplied with a storage medium device that is a subscriber identity module card storing identification data that identifies a subscriber to a mobile telecommunications service, this allows the software apparatus to be customised in a manner desired by the provider of the mobile telecommunications service.

This may be applied to various types of querying systems.

One possible application is to a querying system in which the query messages include query data input by a user, for example an internet search system where the query engine is an internet search engine, and the results of queries are locations on the internet.

Another possible application is to a querying system in which the query messages include query data generated by the computer apparatus, for example a content recommendation system where the query data represents a profile of audio-visual content delivered to the user of the computer apparatus, the query engine is a content recommendation engine, and the results of queries identify further audio-visual content.

According to further aspects of the present invention, there are provided a computer program capable of implementing a similar method, a computer apparatus on which a similar method is implemented and a storage medium device capable of use with such a method or computer apparatus.

Embodiments of the present invention will now be described by way of non-limitative example with reference to the accompanying drawings.

BRIEF DESCRIPTION OF THE DRAWINGS

FIGS. 2 to 4 are schematic diagrams of the computer apparatus illustrating customisation of applications;

DETAILED DESCRIPTION OF THE INVENTION

Figure 1:
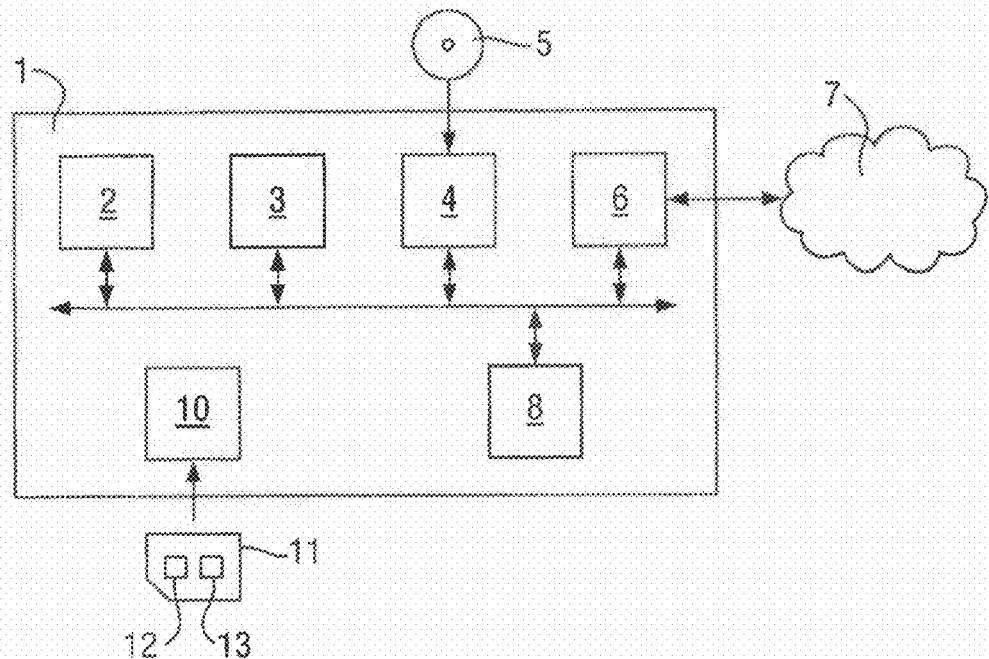
FIG. 1 is a diagram of a computer apparatus.

There will now be described an embodiment of the present invention that may be implemented in a computer apparatus 1 as shown in FIG. 1. The computer apparatus 1 may be a personal computer of a conventional type and includes a processor 2, a memory 3, a drive 4 for reading a recording medium 5 such as a CD or DVD, and a network interface 6 for connecting the computer apparatus 1 to a network 7 that may be a mobile telecommunications network allowing connection to the internet. The computer apparatus 1 also includes a display device 8.

The invention may equally be applied to a computer apparatus 1 of any other type besides a personal computer. Non-limitative examples of other types of computer apparatus include a mobile telephone, or any network connected entertainment devices such as a personal media players for video and/or music or e-book devices.

Applications for the computer apparatus 1 may be stored on a storage medium, for example the memory 3, or the recording medium 5 for subsequent installation in the computer apparatus 1. Applications installed in the computer apparatus 1 and stored in the memory 3 are executed by the processor 2 thereby causing the computer apparatus 1 to operate in accordance with the application.

The computer apparatus 1 further comprises an MM-SIM card interface 10 to which an MM-SIM card 11 may be removably connected. SIM stands for "subscriber identity module". The MM-SIM card stores identification data that identifies a subscriber to a mobile telecommunications service. This is used to allow the computer apparatus 1 access to the mobile telecommunications service over the network 7. MM stands for "multimedia". An MM-SIM card 11 is a normal SIM card extended with a ROM 12 and RAM 13 that act as storage mediums, being USB mass-storage devices. Thus the MM-SIM card 11 is an example of a storage medium device. The invention may equally be applied to a storage medium device 11 of any other type that may be connected by any suitable storage medium device. Non-limitative examples of other types of storage medium device include USB memory devices connected by a USB interface, memory cards connected by a memory card interface, or memory units of portable devices such as mobile telephones. Another example is that the storage medium device 11 is itself a computer apparatus, for example a mobile telephone that connects to the computer apparatus 1 for example by a USB interface. In this case, the storage medium on which the customisation data is stored may be a memory (fixed or removable) of the mobile telephone that forms the storage medium device 11, and the customisation data may be transferred to the mobile phone by any conventional means, for example Bluetooth, a physical network connection, data connection via a telecommunication network, messaging service, or indeed by transfer of an MM-SIM card to the mobile telephone.

To perform customisation the MM-SIM card 11 stores customisation data that may be stored in a structured data format, for example in an XML file of a specific format, though any suitable data format could be used. The customisation data is stored at a predetermined location in the ROM 12 or RAM 13, that is at a specific path preferably in the root directory to facilitate detection thereof.

Figure 2:
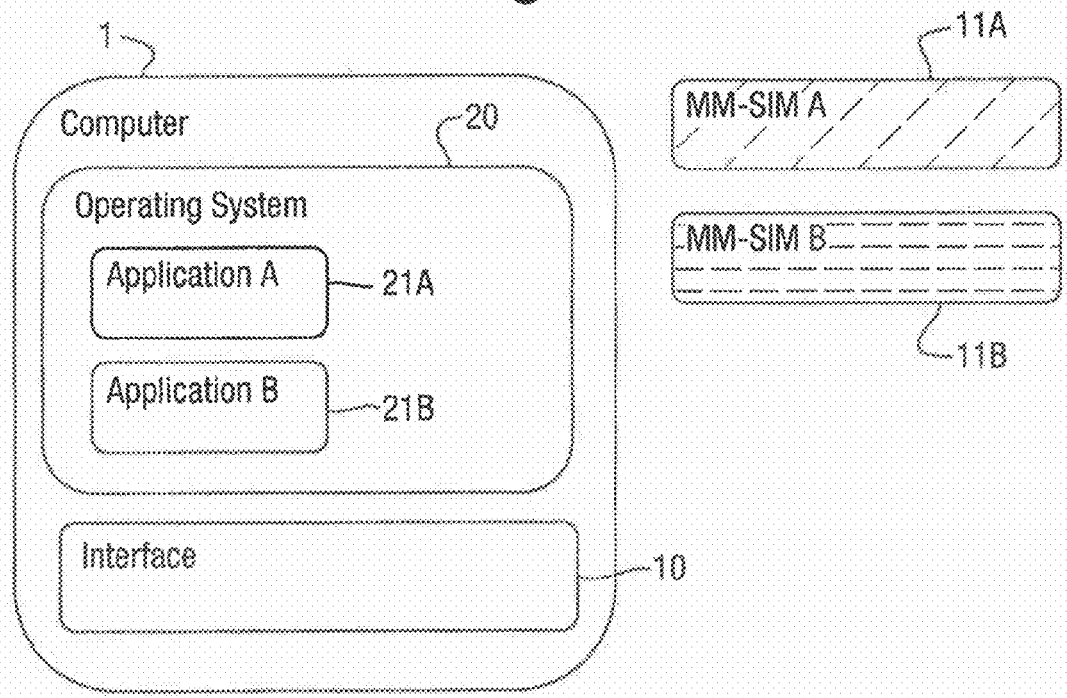

On connection of an MM-SIM card 11 to the MM-SIM card interface 10, one or more applications installed in the computer apparatus 1 may be automatically customised in accordance with customisation data stored on the MM-SIM card 11, as shown schematically in FIGS. 2 to 4. FIG. 2 illustrates the computer apparatus 1 and two applications 21A and 21B that are executable under the operating system 20 of the computer apparatus 1. FIG. 2 also illustrates two MM-SIM cards 11A and 11B, shown schematically with diagonal and horizontal shading, that may be connected to the MM-SIM card interface 10. FIG. 3 illustrates the case that the first MM-SIM card 11A is connected, in which case the applications 21A and 21B are customised thereby, as shown schematically by the diagonal shading thereof. Similarly, FIG. 4 illustrates the case that the second MM-SIM card 11B is connected, in which case the applications 21A and 21B are customised thereby, as shown schematically by the horizontal shading thereof.

If plural MM-SIM cares 11, for example both MM-SIM card 11A and MM-SIM card 11B, are connected, then the computer apparatus may be customised by one of the MM-SIM cards 11, for example the first or most recently detected MM-SIM card 11.

Figure 5:
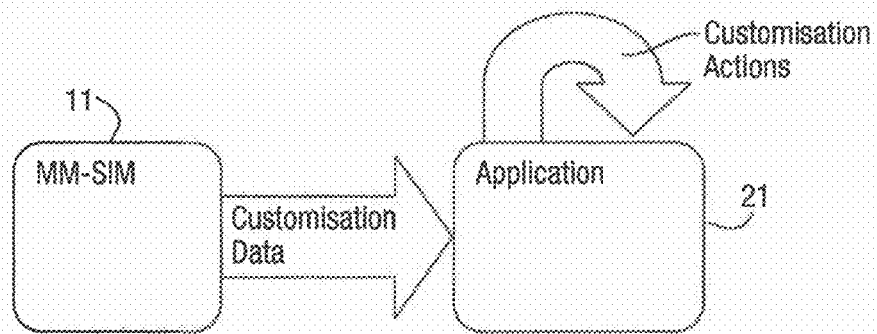
FIG. 5 is a diagram illustrating customisation by an application.
Figure 6:
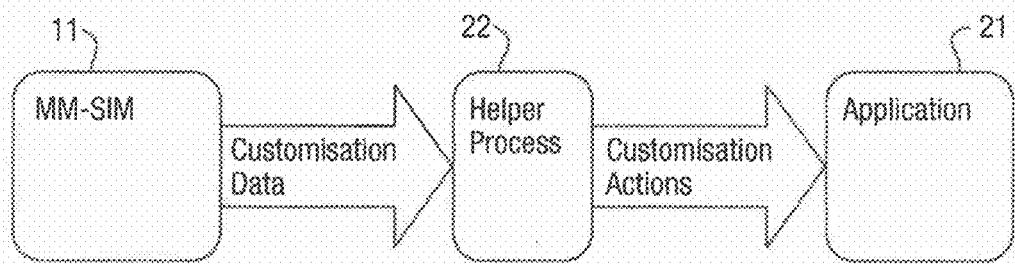
FIG. 6 is a diagram illustrating customisation by a helper process.

As shown schematically in FIG. 5, the customisation may occur by the application 21 itself detecting the customisation data and taking actions to customise itself. Alternatively, as shown schematically in FIG. 6, the customisation may be performed by a separate helper process 22, being itself an application executed by the processor 2 that is associated with the application 21. In this case, the helper process 22 detects the customisation data and takes actions to customise the application 21.

Figure 7:
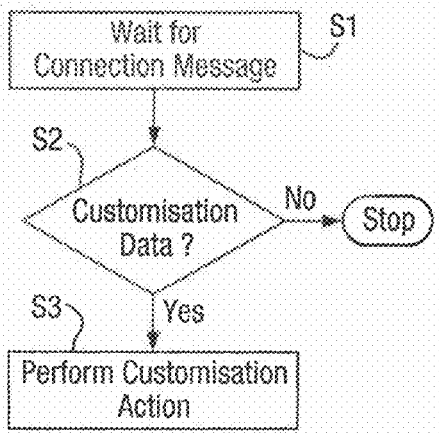
FIG. 7 is a flow chart of the steps performed in the customisation.

The process performed by the application 21 or helper process 22 to perform the customisation is shown in FIG. 7. In step S1, there is awaited a message from the operating system 20 that a MM-SIM card 11 has been connected to the MM-SIM card interface 10. In step S2, it is detected whether the MM-SIM card 11 stores customisation data in the predetermined location. If not then the process stops, but if customisation data is detected then in step S3, the customisation actions are performed to customise the application 21.

Figure 8:
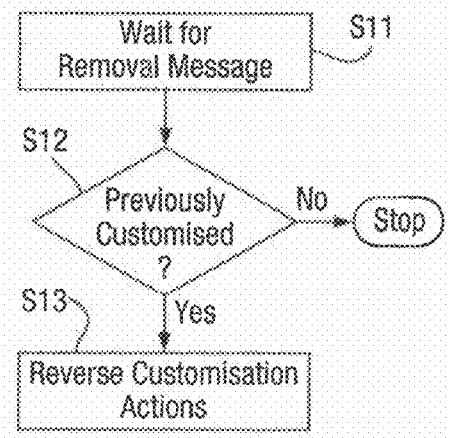
FIG. 8 is a flow chart of the steps performed in reversing the customisation.

Optionally, the customisation may be reversed on removal of the MM-SIM card 11, again by either the application 21 or helper process 22. The process performed is shown in FIG. 8. In step S11, there is awaited a message from the operating system 20 that the MM-SIM card 11 has been removed from the MM-SIM card interface 10. In step S12, it is determined whether the application 21 was previously customised in accordance with customisation data stored on the MM-SIM card 11. If not then the process stops, but if so then in step S13, actions are performed to reverse the customisation of the application 21. This causes the application 21 to revert to a default configuration. This may be achieved by reverting to a copy of the customisation data that has been cached locally on the computer apparatus 1 during the initial customisation.

In accordance with a general aspect of the invention, there may be provided a method of customizing an application in a computer apparatus that comprises a storage medium interface to which a removable storage medium device that includes a storage medium is capable of connection, the method comprising:

on connection of a removable storage medium device to said storage medium interface, detecting whether there is stored in the storage medium of the removable storage medium device customisation data that specifies a change in the behaviour of the application;

in response to detecting said customisation data, changing the behaviour of the application in accordance with the customisation data.

There will now be described a specific example of an application 21 and the customisation that may be effected.

In this example, the application 21 is called VAIO Gate and provides a user interface to the computer apparatus 1. In particular, VAIO Gate is an application launcher and notification system that operates under a Windows operating system, for example Windows 7, and is continuously present on the Windows desktop. For Windows 7, VAIO Gate implements a clean desktop policy to replace the set of icons that were pre-installed on the desktop in previous operating systems, and operates as follows.

Figure 9:
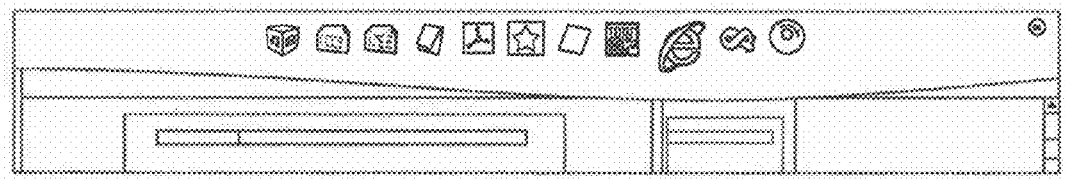
FIG. 9 is a view of the top part of a screen of the display device on which the VAIO Gate container is displayed.

In particular, as shown in FIG. 9, VAIO Gate displays a set of icons 30 in a container 31 that may be positioned ("docked") on the edge of a screen 32 of the display device, typically the top edge as shown in FIG. 9. The container 31 may be shown when a pointer hovers over a region close to the edge where the container 31 is docked, but hidden otherwise.

VAIO Gate stores user interface data that includes, in respect of each icon 30 in the set, target data, icon data and text data.

The target data specifies a target object at a target location.

The icon data identifies the icon 30 to be displayed in the container 30, for example by specifying the path of an image file for the icon 30. The icon data is optional. If icon data is not present in respect of an icon, a default icon is displayed, for example selected in accordance with the file type of the target object, or in accordance with the application used to launch the target object The text data represents text to be displayed in association with the icon 30. In principle, the text data is optional and may be omitted. The text data includes caption data that represents text that is displayed in a caption below the icon 30 and tip data that represents text that is displayed in tooltip container when a pointer hovers over the icon 30.

VAIO Gate accepts user-input that selects any one of the displayed icons 30. In response to such selection of a displayed icon 30, VAIO Gate performs the action in accordance with the target data, in particular launching the target object specified by the target data. The target object may be of various different types, for example as follows.

The target object may be an executable file that contains an executable program. In this case, launching of the target object consists of executing the program.

The target object may be a document file containing a document that is rendered by an application. In this case, launching of the target object consists of opening the application and rendering the document.

The target object may be a web page at a location on a network. In this case, launching of the target object consists of launching a browser and opening the webpage. The web page, being for example in HTML format, may be considered as a special case of a document file.

The target object may be a folder in the file system of the computer apparatus 1. In this case, launching of the target object consists of opening the folder.

VAIO Gate also periodically displays notifications in the container 31, in place of the icons 31. The notifications are displayed at periodic intervals, even if the container 31 is previously hidden. The notifications may be: text, an image, a video clip, an icon that may be selected to perform an action; or a hyperlink. The notifications may serve to provide advertisements, notification from other applications or messages from RSS feeds.

VAIO Gate is extended to provide querying system for example to support searching for multimedia content and/or to provide multimedia content recommendations. Such a querying system may access a query engine at a location on a network such as the internet. Query messages are sent by VAIO Gate over the network to the query engine. Result messages representing results of queries are sent back from the query engine over the network and received by VAIO Gate which then displays the results on the display device 8.

Two embodiments of such a querying system will now be described.

Figure 10:
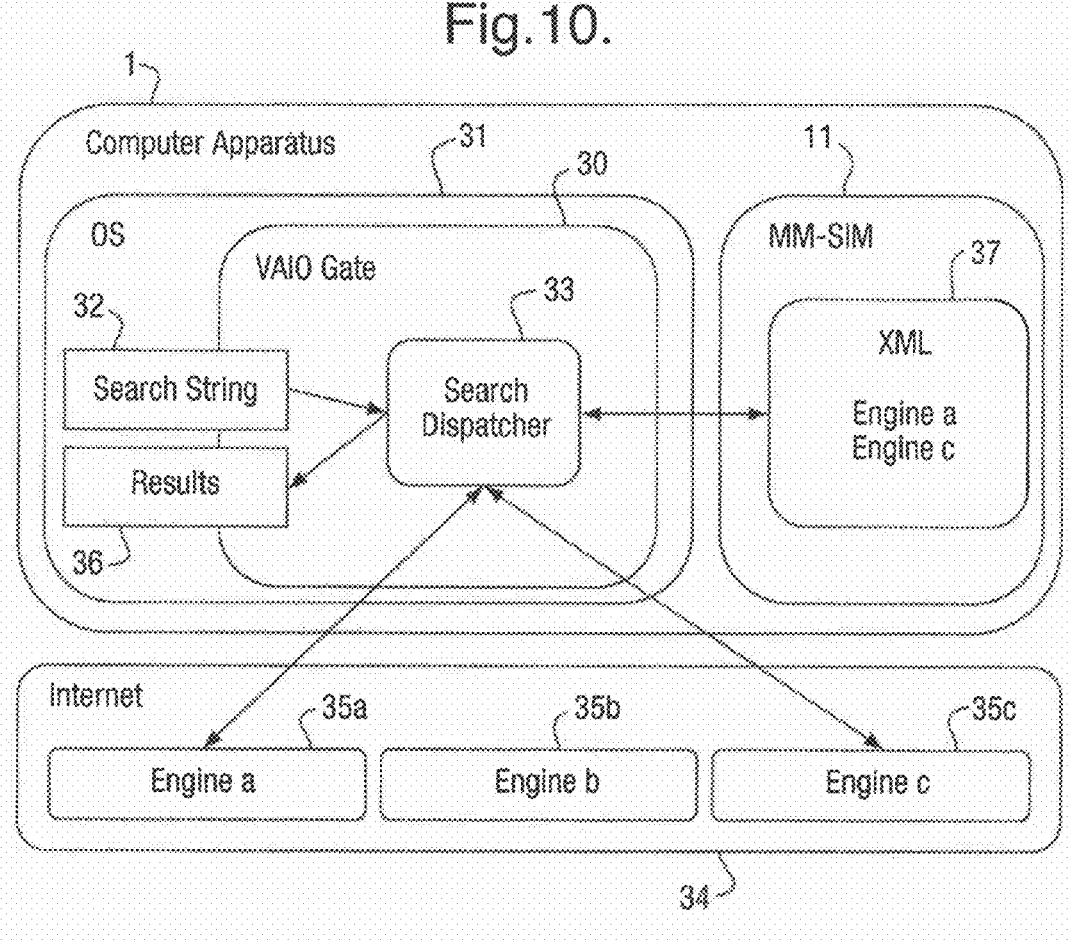
FIG. 10 is a diagram of the computer apparatus connected to internet search engines.

In the first embodiment illustrated in FIG. 10, the querying system provides internet searching. VAIO Gate 30 operating under the operating system 31 provides a user-interface 32 allowing a user to input query data that is typically a keyword for a website of interest. The user interface 32 may be a simple text box.

VAIO Gate 30 uses a search dispatcher 33 that generates query messages including the input query data, and then sends the query messages over the internet 34 to locations where an internet search engine 35 is provided. The search dispatcher 33 may be part of VAIO Gate 30 or may be a separate helper process, being itself an application executed by the processor 2. In general, there are many such search engines 35 on the internet 34 to which such messages may be sent. VAIO Gate 30 stores query engine data that identifies one or more of the search engines 35 to which the search dispatcher 33 sends the query data. In response to the query messages, the search engines 35 generate results messages providing results that are locations on the internet 34, for example identified by URLs.

VAIO gate 30 then displays the results in a container 36 on the screen of the display device 8, for example as notifications.

Figure 11:
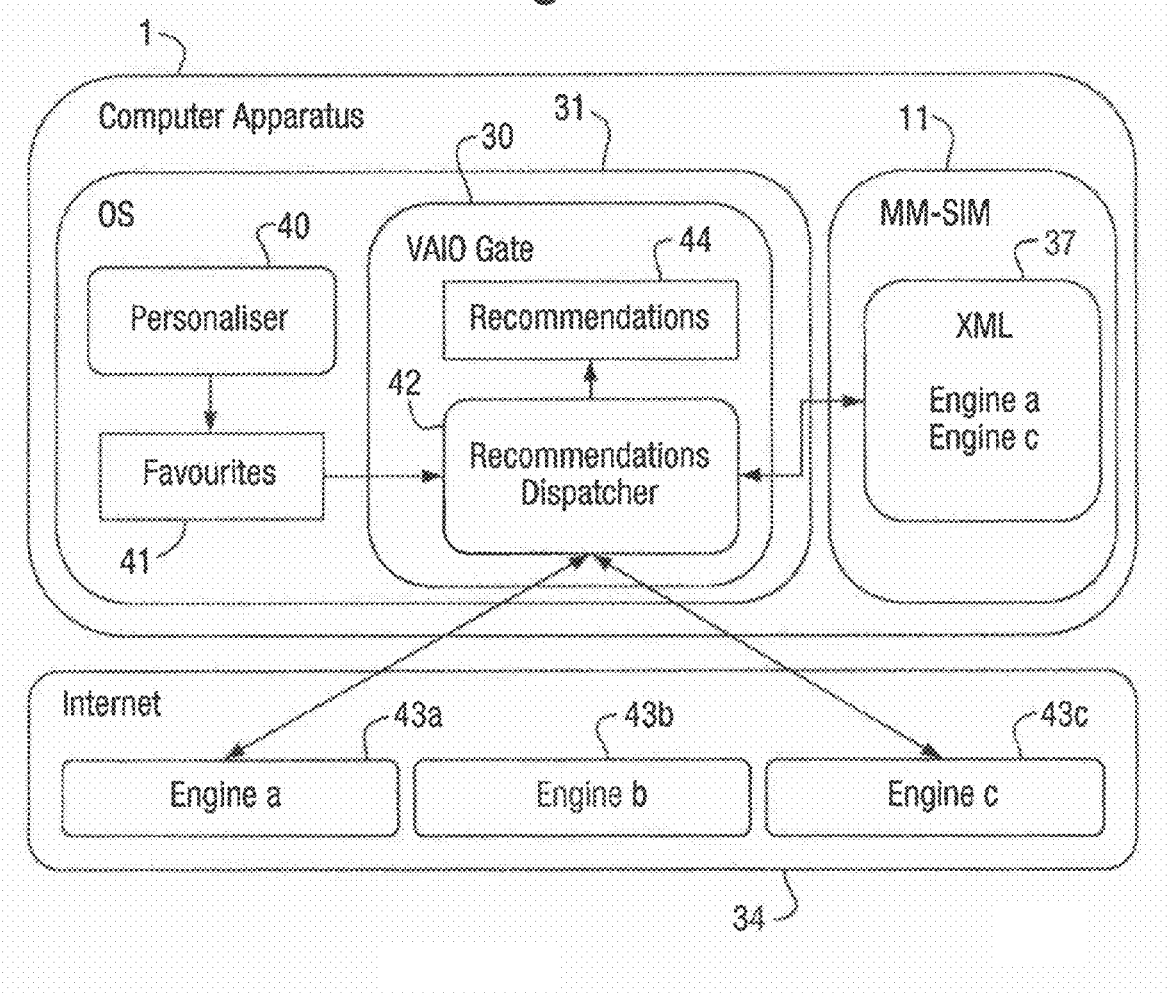
FIG. 11 is a diagram of the computer apparatus connected to content recommendation engines.

In the second embodiment illustrated in FIG. 11, the querying system provides content recommendation. A personaliser engine 40 operating under the operating system 31 continuously builds up a profile 41 of audio-visual content delivered to the user, based on the interactions of the user with the computer apparatus 1. For example, the songs and other media played by the different media players on the computer apparatus 1 are monitored to compile a list of favourite artists and favourite contents in the profile 41. In general the data can be collected from anywhere and can include media related data (e.g. preferred artist) or a computer dated (e.g. CPU temperature) or user data (e.g. how often the system was rebooted). The computer application 1 may be configured with server software for which client devices are able to stream or otherwise obtain content. Such interactions by client devices may be used to form all or part of the profile 41.

VAIO Gate 30 also provides a recommendation dispatcher 42 that generates query messages including the profile 41, and then sends the query messages over the internet 34 to locations where a content recommendation engine 43 is provided. This may be done periodically or when instructed by user input. The recommendation dispatcher 42 may be part of VAIO Gate 30 or may be a separate helper process. In the latter case, the separate helper process may also provide an interface to search engines, server infrastructure and/or services of partners on the internet. The recommendation dispatcher 42 may send query messages directly, or to a server that dispatches query messages to the correct content recommendation engine 43. In general, there are many such content recommendation engines 43 on the internet 34 to which such messages may be sent. VAIO Gate 30 stores query engine data that identifies one or more of the content recommendation engines 43 to which the recommendation dispatcher 42 sends the query data. In response to the query messages, the content recommendation engines 43 generate results messages providing results that identify further audio-visual content. Typically, these results are hyperlinks that point to content on the providers' sites. These results are generated based on the profile 41. The further audio-visual content identified is similar to the audio-visual content in the profile and therefore likely to be of interest to the user.

VAIO gate 30 then displays the results in a container 44 on the screen of the display device 8, for example as notifications.

In step S3, VAIO Gate 30 is customised by changing the query engines, for example the search engines 35 or the content recommendation engines 43 to which query messages are sent. This effectively sets the online service to use. This is achieved by changing query engine data in accordance with the customisation data 37 stored in the MM-SIM 11. In particular, the customisation data 37 indicates additional locations on the network where a query engine is provided. The inclusion of the additional locations in the query engine data causes VAIO Gate 30 to send query messages to the query engines in those locations. The query engine data may be changed by adding the additional locations to the existing locations, or by replacing the existing locations by the additional locations.

By way of example, FIGS. 10 and 11 illustrate the case that the customisation data identifies two query engines, namely search engines 35a and 35c or content recommendation engines 42a and 42c to which query messages are consequently then sent.

To achieve this, the customisation data may be arranged as an XML file, as follows.

The XML file is called VAIOGate.xml. The root element of the XML file is named "VAIOGate". It must have an attribute "Operator" specifying the operator. It must also have an attribute "Version" that must have the value "1.0".

In step S2, it is determined whether this file called VAIOGate.xml exists at the predetermined location in root directory of the ROM 12 or RAM 13 of an MM-SIM 11, and if so whether it includes the customisation data specified below.

In the case of the interne searching system illustrated in FIG. 10, the root element "VAIOGate" can contain an optional "Search" element. This element can contain zero or more "Provider" elements.

The "Provider" element can contain the elements indicated in the following table.

| Name | Description | Example |
| --- | --- | --- |
| Name | The name of the provider of the search engine | Google |
| Url | The location of the search engine, in particular as an URL. | http://www.google.com/search?q="$" |
| Placeholder | The placeholder for the search string in the URL. This placeholder must be replaced by the actual search string when a GET request is sent to the service. | $ |

In the case of the content recommendation system illustrated in FIG. 11, the root element "VAIOGate" can contain an optional "Recommendations" element. This element can contain zero or more "Provider" elements.

The "Provider" element can contain the elements indicated in the following table.

| Name | Description | Example |
| --- | --- | --- |
| Name | The name of the provider of the content recommendation engine. | Orange |
| Url | The location of the content recommendation engine, in particular as an URL. | http://www.myfavouriteprovider.com/recommendations?favourites=$ |
| Placeholder | The placeholder for the profile 41 in the URL. This placeholder must be replaced by the profile when a GET request is sent to the service. | $ |
| Separator | The separator to separate the different items in the profile 41 sent to the content recommendation engine. | , |

In step S3, the query engine data is changed to include these elements in respect of each additional query engine.

Optionally, other types of customisation of an application 21 may additionally be performed on the basis of the customisation data.

The invention claimed is:

1. A method of customizing a querying system, the method comprising:
 storing, in a computer apparatus, first query engine data identifying first one or more locations on a network where first one or more query engines are located;
 sending, with the computer apparatus, query messages over the network to a location selected from the first one or more locations identified by the first query engine data;

receiving result messages representing results of queries sent from the first one or more query engines over the network to the computer apparatus in response to the query messages;

displaying the results of queries on a display device; and on connection of a removable subscriber identity module card that includes a storage medium storing identification data that identifies a subscriber to a mobile telecommunications service to a subscriber identity module card interface of the computer apparatus, detecting whether the storage medium of the removable subscriber identity module card stores customization data that includes second query engine data identifying second one or more locations on the network where second one or more query engines are located, the second one or more query engines being different from the first one or more query engines, and, in response to detecting said customization data, changing the first query engine data stored in the computer apparatus to the second query engine data, wherein the query messages include query data generated by the computer apparatus, and wherein the query data represents a profile of audio-visual content delivered to a user of the computer apparatus, and the results of queries identify further audio-visual content.

2. The method according to claim 1, wherein the query messages include query data input by a user.

3. The method according to claim 2, wherein the results of queries are locations on the internet.

4. The method according to claim 1, wherein the customization data indicates additional locations on the network where a query engine is provided, and said changing further comprises adding the additional locations to the first query engine data.

5. The method according to claim 1, further comprising:
storing notification data representing notifications for periodic display; and
periodically displaying, on the display device, notifications in accordance with the notification data, wherein
said displaying the results of queries represented by the result messages comprises changing the notification data to additionally include data representing the results of queries as an additional notification.

6. The method according to claim 1, wherein the network is the internet.

7. The method according to claim 1, further comprising:
detecting removal of said removable subscriber identity module card from said subscriber identity module card interface; and
in response to detecting said removal of said removable subscriber identity module card, reversing said changing of the first query engine data to the second query engine data back to the first query engine data.

8. The method according to claim 1, wherein the customisation customization data is stored in an XML file.

9. The method according to claim 1, wherein the step of said detecting whether the storage medium of the removable subscriber identity module card stores customisation customization data comprises detecting whether the storage medium of the removable subscriber identity module card stores customisation customization data in a predetermined location.

10. The method according to claim 9, wherein the predetermined location is a root directory of the storage medium.

11. The method according to claim 1, further comprising:
on connection of a plurality of the removable subscriber identity module cards, changing the first query engine data stored in the computer apparatus to the second query engine data included in one of the plurality of the removable subscriber identity module cards.

12. The method according to claim 1, further comprising:
on connection of a plurality of the removable subscriber identity module cards, changing the first query engine data stored in the computer apparatus to the second query engine data included in a first or a most recently detected one of the plurality of the removable subscriber identity module cards.

13. A non-transitory computer readable storage medium encoded with instructions, which when executed by a computer apparatus, causes the computer apparatus to execute a method of customizing a querying system comprising:
storing first query engine data identifying first one or more locations on a network where first one or more query engines are located;

sending, with the computer apparatus, query messages over the network to a location selected from the first one or more locations identified by the first query engine data;

receiving result messages representing results of queries sent from the first one or more query engines over the network to the computer apparatus in response to the query messages;

displaying the results of queries on a display device; and on connection of a removable subscriber identity module card that includes a storage medium storing identification data that identifies a subscriber to a mobile telecommunications service to a subscriber identity module card interface of the computer apparatus, detecting whether the storage medium of the removable subscriber identity module card stores customization data that includes second query data identifying second one or more locations on the network where second one or more query engines are located, the second one or more query engines being different from the first one or more query engines, and, in response to detecting said customization data, changing the stored first query engine data stored to the second query engine data wherein the query messages include query data generated by the computer apparatus, and wherein the query data represents a profile of audio-visual content delivered to a user of the computer apparatus, and the results of queries identify further audio-visual content.

14. A computer apparatus comprising:
a memory configured to store computer executable instructions; and
circuitry configured to:
store first query engine data identifying first one or more locations on a network where first one or more query engines are located, send query messages over the network to a location selected from the first one or more locations identified by the first query engine data, receive result messages representing results of queries sent from the first one or more query engines over the network to the computer apparatus in response to the query messages, display the results of queries on a display device, and on connection of a removable subscriber identity module card that includes a storage medium storing identification data that identifies a subscriber to a mobile telecommunications service to a subscriber identity module card interface of the computer apparatus, detect whether the storage medium of the removable subscriber identity module card stores customization data that includes second query engine data identifying second one or more locations on the network where second one or more query engines are located, the second one or more query engines being different from the first one or more query engines, and, in response to the detection of said customization data, change the stored first query engine data stored to the second query engine data wherein the query messages include query data generated by the computer apparatus, and wherein the query data represents a profile of audio-visual content delivered to a user of the computer apparatus, and the results of queries identify further audio-visual content.

15. The computer apparatus according to claim 14, wherein the query messages include query data input by a user.

16. The computer apparatus according to claim 15, wherein the results of queries are locations on the internet.

17. The computer apparatus according to claim 14, wherein the customization data indicates additional locations on the network where a query engine is provided, and said circuitry is further configured to add the additional locations to the first query engine data.

18. The computer apparatus according to claim 14, wherein the computer apparatus stores notification data representing notifications for periodic display, the circuitry is configured to cause the display device to periodically display notifications in accordance with the notification data, and said circuitry is configured to change the notification data to additionally include data representing the results of queries as an additional notification.

19. The computer apparatus according to claim 14, wherein the network is the internet.

20. The computer apparatus according to claim 14, wherein the circuitry is configured to detect removal of said removable subscriber identity module card from said subscriber identity module card interface, and, in response to detecting said removal of said removable subscriber identity module card, to reverse said changing of the first query engine data to the second query engine data back to the first query engine data.

21. The computer apparatus according to claim 14, wherein the customisation customization data is stored in an XML file.

22. The computer apparatus according to claim 14, wherein the circuitry is configured to detect whether the storage medium of the removable subscriber identity module card stores customization data in a predetermined location.

23. The computer apparatus according to claim 22, wherein the predetermined location is a root directory of the storage medium.

24. A querying system comprising:

the computer apparatus according to claim 14; and the first one or more query engines and the second one or more query engines configured to:

receive said query messages, perform queries, and produce results based on the query messages used to transmit results messages representing the results of the queries to the computer apparatus.

* * * * *